(12) United States Patent
Ma et al.

(10) Patent No.: US 7,253,611 B2
(45) Date of Patent: Aug. 7, 2007

(54) MAGNETIC DISPLACEMENT RULER

(75) Inventors: Liyao Ma, Beijing (CN); Yinghua Chen, Beijing (CN); Yingchun Jiang, Beijing (CN); Jie Zhang, Beijing (CN)

(73) Assignee: Beijing Aerospace Feng Guang Electronic Technical Corp. Ltd., Beijing (CN)

( * ) Notice: Subject to any disclaimer, the term of this patent is extended or adjusted under 35 U.S.C. 154(b) by 70 days.

(21) Appl. No.: 10/534,111

(22) PCT Filed: Nov. 8, 2002

(86) PCT No.: PCT/CN02/00799

§ 371 (c)(1),
(2), (4) Date: May 6, 2005

(87) PCT Pub. No.: WO2004/048885

PCT Pub. Date: Jun. 10, 2004

(65) Prior Publication Data

US 2006/0103376 A1    May 18, 2006

(51) Int. Cl.
*G01B 7/14* (2006.01)
(52) U.S. Cl. .............................. 324/207.2; 324/207.24; 33/708
(58) Field of Classification Search .................. 33/708
See application file for complete search history.

(56) References Cited

U.S. PATENT DOCUMENTS

| | | | |
|---|---|---|---|
| 3,768,094 A * | 10/1973 | Henrich | 341/15 |
| 4,039,936 A * | 8/1977 | Jones et al. | 324/207.21 |
| 4,226,024 A | 10/1980 | Gerhard | |
| 4,612,502 A | 9/1986 | Spies | |
| 4,639,807 A * | 1/1987 | Sekizawa et al. | 360/315 |
| 5,174,041 A | 12/1992 | Lorenz | |
| 6,229,301 B1 * | 5/2001 | Bolli et al. | 324/207.21 |
| 6,332,278 B1 * | 12/2001 | Bezinge et al. | 33/784 |
| 6,550,150 B1 * | 4/2003 | Shirai et al. | 33/290 |
| 6,935,193 B2 * | 8/2005 | Heisenberg et al. | 73/862.324 |

FOREIGN PATENT DOCUMENTS

| | | |
|---|---|---|
| CN | 1254412 | 5/2000 |
| EP | 0053091 | 6/1982 |
| SE | 7714010 | 6/1979 |

\* cited by examiner

*Primary Examiner*—Jay M. Patidar
(74) *Attorney, Agent, or Firm*—Foley & Lardner LLP

(57) ABSTRACT

This invention relates to a magnetic displacement measurement device, which comprises a ruler body and a vernier, wherein a magnetic main ruler is fixed on the ruler body, and a secondary ruler is fixed on the vernier; the secondary ruler comprises a magnetic sensor and a measurement circuit thereon; said magnetic sensor is composed of magnetoresistances; said measurement circuit comprises at least two measurement bridges composed of magnetoresistances; the movement distance of the vernier is displayed on the display screen of the device after being detected by the magnetic sensor and being processed by the measurement circuit. The magnetic displacement measurement device provided by the invention not only can normally work in the wet and oil polluted environment, but also has the advantages of simple structure, convenient manufacture, low price, low power consumption and high precision.

15 Claims, 8 Drawing Sheets

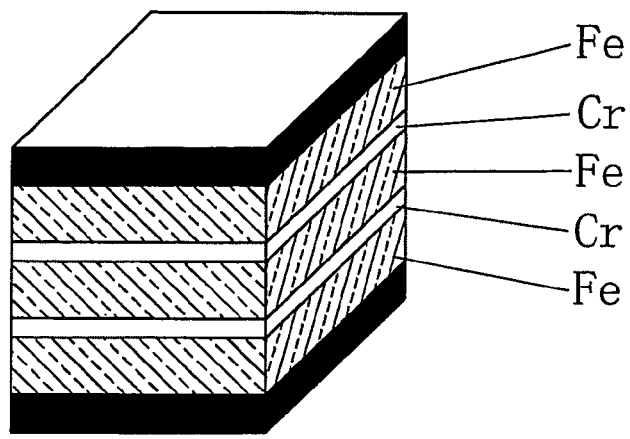
Fig.10
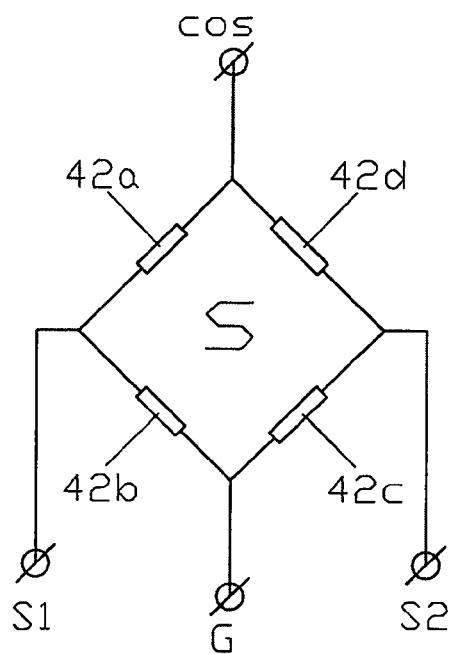
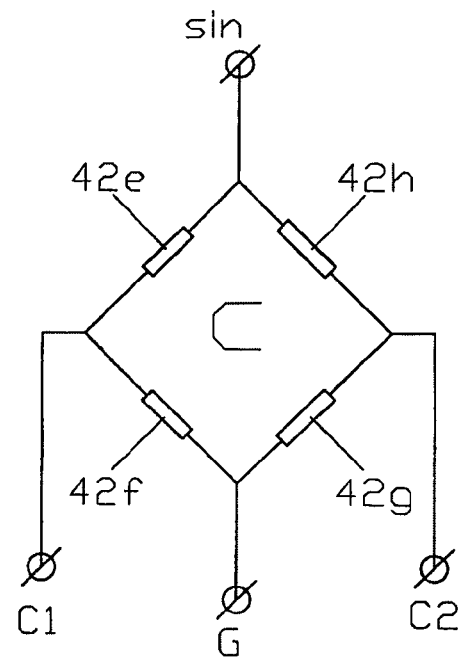
Fig.11a  Fig.11b

US 7,253,611 B2

MAGNETIC DISPLACEMENT RULER

TECHNICAL FIELD

The invention relates to a magnetic measurement device for measuring length and angle, particularly to a magnetic measurement device of an electronic digital display caliper.

BACKGROUND OF THE ART

Conventional mechanical vernier caliper is gradually replaced with the electronic digital display caliper. The electronic digital display caliper most widely used at present uses capacitive displacement sensors, and the output of the sensor is associated with the relative positions of the capacitor plates on the main ruler and the secondary ruler. With the processing of the electronic circuit, the data of the relative positions is displayed in the display screen. The electronic digital display caliper in this principle is described in SE7714010 and European Patent EP0053091. Although the electronic digital display caliper in this principle has high precision and low power consumption, there is a specific requirement for application environment of the caliper. The caliper will work abnormally in wet environment or in the environment with lubrication and dust and the like. However, it is difficult to avoid such environment in practice, which will limit the application range of such kind of electronic digital display caliper.

In order to allow the electronic digital display caliper to work normally in wet environment and in the environment with lubrication and dust and the like, one solution is to measure displacement by using a magnetic displacement sensor. The magnetic displacement measurement method has been described in U.S. patents of U.S. Pat. Nos. 4,226,024, 4,612,502 and 5,174,041. However, the structure disclosed in the above patents is complicated and has high power consumption and low precision, which is not usable as a portable measuring tool. Chinese Patent Application No. CN1254412A discloses a magnetic portable electronic digital display caliper, in which the magnetic displacement sensor uses such a structure as shown in FIG. 3, wherein a main ruler 103 is provided on the ruler body 101; a plastic film 134 is provided on the surface of the main ruler; the main ruler 103 uses substrate made of magnetic material and is magnetized at constant intervals in the movement direction so as to form grid-type magnetic poles, thereby the magnetic field intensity on the surface of the main ruler 103 varies with the period of grid pitch $\lambda$; a substrate 141 is fixed on a vernier corresponding to the main ruler 103 and a magnetoresistance 142 is provided on the substrate 141; said magnetoresistance 142 detects the magnetic field intensity on the surface of the main ruler 103 so as to realize the measurement of position. Because it is not easy to make the magnetization intensity of the main ruler 142 is in the form of single layer film, the resistance change rate is small, which would impose high requirement on the measurement circuit. In addition, the bridge used to detect the resistance change is a DC bridge; and the displacement amount is calculated according to the amplitude output from the bridge. Therefore, this method will bring displacement float due to external electronic interference and environment variation, eventually will influence the measurement precision.

CONTENTS OF THE INVENTION

An object of the invention is to provide a magnetic displacement measurement device, which not only can normally work in the wet and oil polluted environment, but also have the advantages of simple structure, convenient manufacture, low price, low power consumption and high precision.

The above object of the invention can be realized by the following measure.

A magnetic displacement measurement device, comprising a ruler body and a vernier which can move with respect to the ruler body, wherein a magnetic main ruler is fixed on the ruler body, and a secondary ruler is fixed on the vernier; the secondary ruler comprises a magnetic sensor and a measurement circuit thereon; said measurement circuit outputs the signal of movement distance to an signal output device; wherein:

said magnetic main ruler is of grid type, and the grids thereof are arranged at a constant interval along a movement direction with a grid pitch of $\lambda$;

said magnetic sensor is composed of magnetoresistances which are opposite to the magnetic main ruler and arranged along the movement direction;

said measurement circuit comprises at least two measurement bridges which are composed of magnetoresistances; and the output of the bridge is in a function relation with the displacement;

said magnetic main ruler is provided such that magnetic grids arranged with a grid pitch of $\lambda$ are provided on a nonmagnetic material substrate;

the magnetoresistances of said magnetic sensor are formed of at least one layer of magnetic film and nonmagnetic film which are alternately arranged;

the magnetic film of said magnetoresistances is selected from one of metal film, alloy film or semiconductor film;

said at least two measurement bridges are electrically connected with an AC power supply, and the phase difference of the AC power supply connected with two measurement bridges is $\pi/2$;

said magnetic main ruler is provided such that magnetic grids arranged with a grid pitch of $\lambda$ are provided on a nonmagnetic material substrate; the magnetoresistances of said magnetic sensor are formed of at least one layer of magnetic film and nonmagnetic film which are alternately arranged; said at least two measurement bridges are electrically connected with an AC power supply, and the phase difference of the AC power supply connected with two measurement bridges is $\pi/2$;

the position difference between the magnetoresistances of the same arms of said two measurement bridges is $n\lambda/4$, wherein n=1, 3, 5, 7 . . . ;

the measurement bridge with a position lead of $n\lambda/4$ is connected with an AC signal with a phase lag of $\pi/2$, wherein n=1, 3, 5, 7 . . . ; the measurement bridge with a position lag of $n\lambda/4$ is connected with an AC signal with a phase lead of $\pi/2$, wherein n=1, 3, 5, 7 . . . ;

said measurement bridge is composed of at least two magnetoresistances, wherein at least two adjacent resistors of the bridge are magnetoresistances with a position difference of $n\lambda/2$, n=1, 3, 5, 7 . . . ;

the position difference between two magnetoresistances which face with each other in said measurement bridge is $m\lambda$, wherein m=0, 1, 2, 3, . . . ;

the magnetoresistances on each arm of said measurement bridge are composed of constant number of magnetoresistances in series with different positions, and the position difference thereof is $m\lambda$, wherein m=0, 1, 2, 3, . . . ;

the width of said magnetoresistances is smaller than $\lambda/2$; each of the magnetoresistances is formed of magnetoresistances with same number and same width in series, with a total width smaller than $\lambda/2$;

the signals output from said two measurement bridges are added and then converted into digital signals through A/D conversion, and the digital signals are connected with the signal output device;

said magnetic main ruler is provided such that magnetic grids with the grid pitch of $\lambda$ are formed on the nonmagnetic material substrate by plating and etching process, or are embedded in the nonmagnetic material substrate;

said magnetic main ruler is provided such that convexes and concaves in grid type with the grid pitch of $\lambda$ are formed on the surface of the magnetic material.

BRIEF DESCRIPTION OF THE DRAWINGS

FIG. 2a is a structural view of magnetic sensor used in the invention;

FIG. 2b is a sectional view taken along A-A in FIG. 2a;

FIG. 7b is a schematic view of the main ruler corresponding to FIG. 7a;

FIG. 10 is a schematic structural view of the multilayer film of the magnetoresistance of the invention;

FIG. 11a is a circuit view of a measuriement bridge S of the invention;

FIG. 11b is a circuit view of a measurement bridge C of the invention;

PREFERRED EMBODIMENTS OF THE INVENTION

Figure 1:
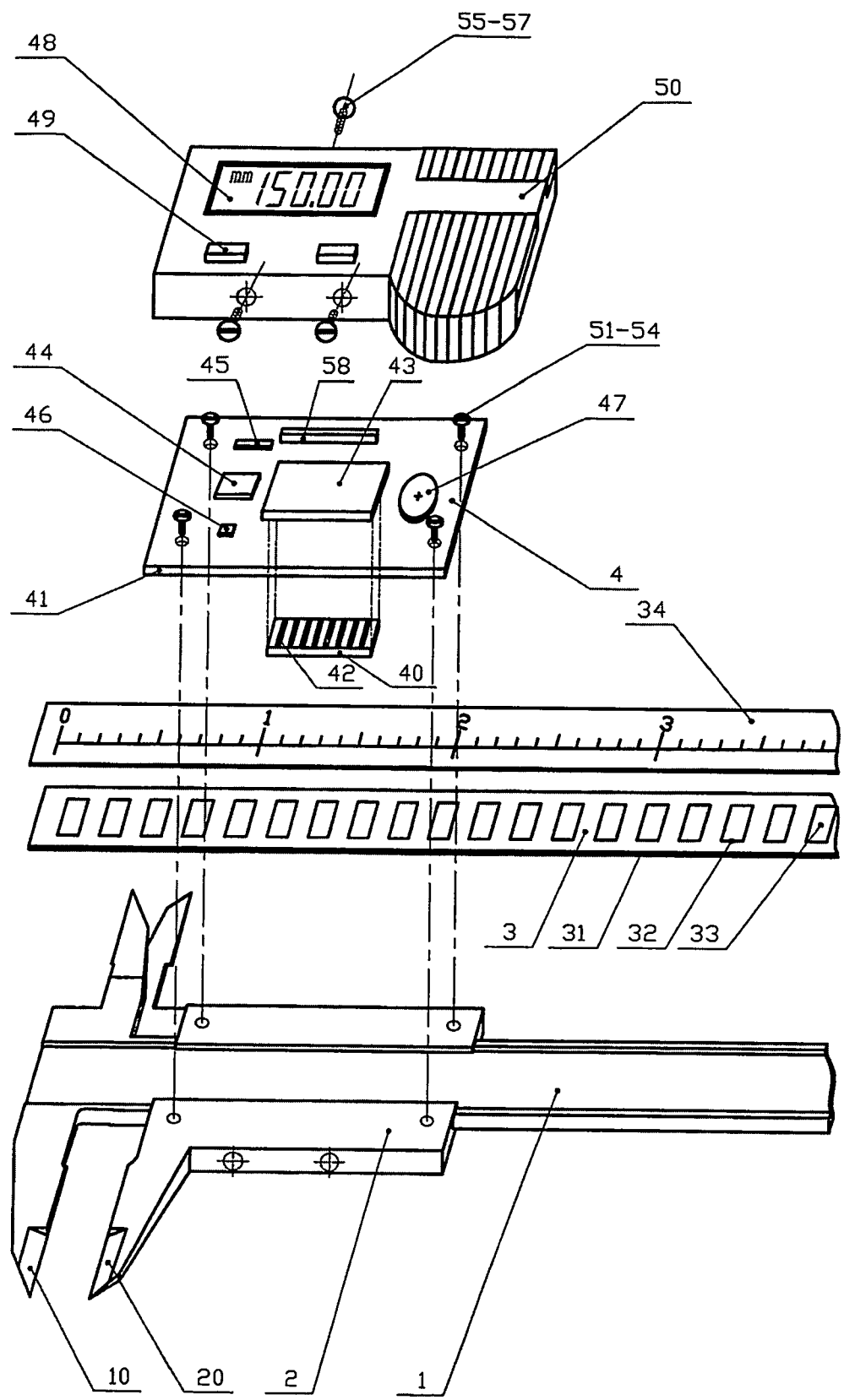
FIG. 1 is an exploded view of an electronic digital display caliper of the invention.

Please refer to FIG. 1, which is an exploded view of an electronic digital display caliper of the invention. A ruler body 1 and a vernier 2 are similar to those of the general mechanical vernier caliper and are made of metal or composite material. The difference lies in that a main ruler 3 is located in a long slot which is formed in the middle of the ruler body 1 by milling process; a secondary ruler 4 and a casing 50 is fixed on the vernier 2; a measuring jaw 10 is integral with the ruler body 1 and a measuring jaw 20 is integral with the vernier 2 so that the vernier 2 may move back and forth along the ruler body 1. The size of the object is measured by moving the measuring jaw 20 and the vernier 2 together with the secondary ruler 4 with respect to the measuring jaw 10, and then the obtained measurement data is displayed on the liquid crystal display screen 48 of the casing 50.

The secondary ruler 4 is another part of the displacement sensor, which is composed of a substrate 40, a printed circuit board 41, magnetoresistances 42, a permanent magnet 43, an IC chip 44, a quartz crystal 45, an electronic assembly 46, and a cell 47, etc. The circuit board 41 is fixed with the vernier 2 by screws 51~54. The casing 50 is provided such that the liquid crystal display screen 48 is connected with the circuit board 41 by conductive rubber 58, the vernier 2 is fixed by screws 55~57, and the button 49 fixed on the casing 50 is used to control an electronic circuit.

Figures 2A, 2B:
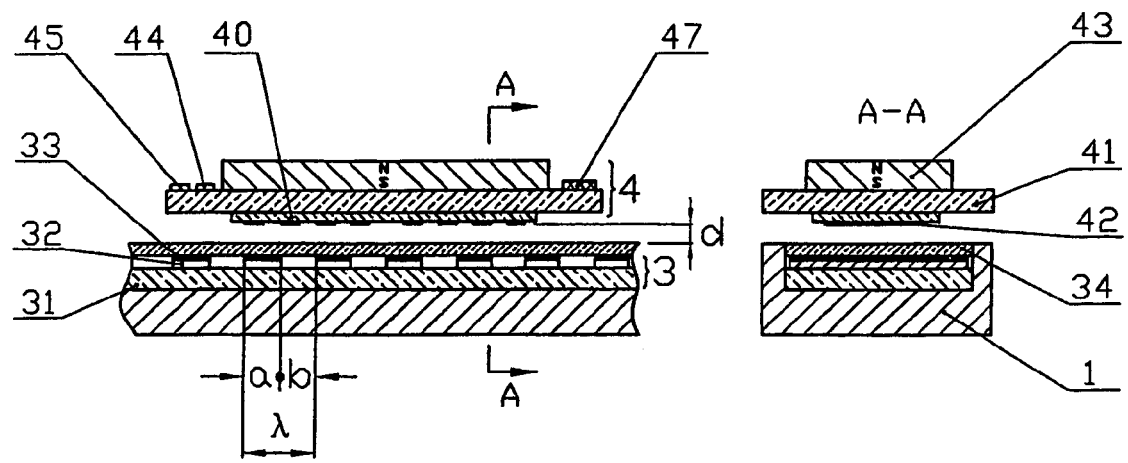
Figure 3:
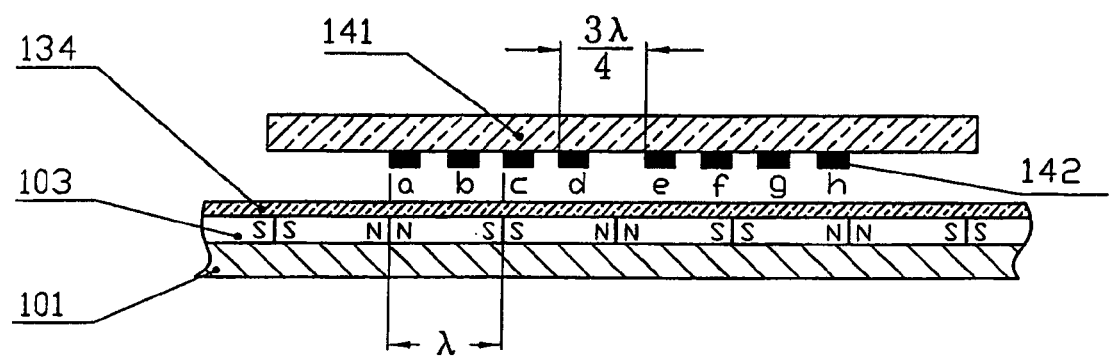
FIG. 3 is a structural view of the conventional magnetic sensor.

FIG. 2a and FIG. 2b are structural views of the magnetic sensor. The sensor comprises two parts, wherein one part is the main ruler 3 and the other part is the secondary ruler 4. The main ruler 3 is fixed on the ruler body 1 by adhesives; the secondary ruler 4 is fixed on the vernier 2 by screws. The main ruler 3 is composed of a substrate 31, copper foil 32, magnetic film 33 and protection film 34; the magnetic film 33 is made to be grid type, wherein the grids are arranged at constant interval along the movement direction, with the grid pitch $\lambda$. The secondary ruler 4 is composed of the substrate 40, the magnetoresistances 42, the printed circuit board 41, the permanent magnet 43, the IC chip 44, the quartz crystal 45, and the cell 47. The magnetoresistances 42 are mounted below the circuit board 41 and face the main ruler 3; the magnetoresistances 42 are arranged at certain interval along the movement direction. The permanent magnet 43 is mounted above the circuit board 41 and aligned with the magnetoresistances 42; the area of the permanent magnet 43 should be larger than the total area of the magnetoresistance set 42. Thereby, the magnetic field on the surface of the grid-type magnetic film 33 produced by the permanent magnet 43 varies with the period of $\lambda$ along the movement direction. Hence, the detected magnetic field intensity varies with the variation of the positions of the magnetoresistances 42 and the grid-type magnetic film 33, and thus the displacement of the vernier 2 with respect to the ruler body 1 can be determined according to variation of magnetic field intensities. The gap d between the main ruler 3 and the secondary ruler 4 is generally 0.2 mm~1.0 mm.

Figure 4:
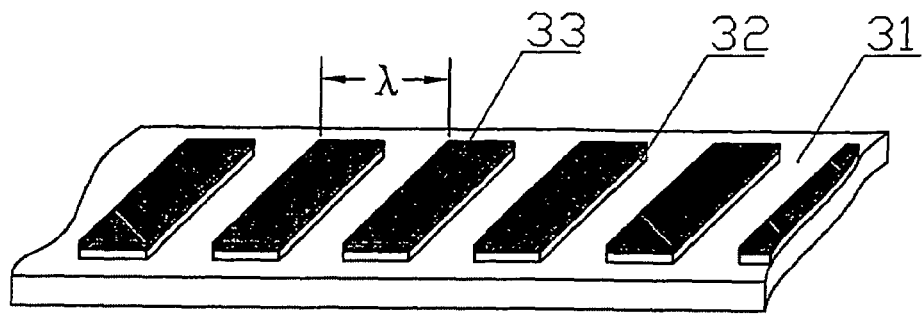
FIG. 4 shows the first embodiment of the main ruler of the invention.

FIG. 4 shows the first embodiment of the main ruler 3. The main ruler 3 are manufactured by the following steps: using non-magnetic printed circuit board (PCB) as a substrate 31; making a mother plate according to the desired grid shape and size; copying the pattern onto a copper foil 32 which has a photosensitive film; then making the copper foil 32 be desired girds with the grid pitch of $\lambda$ and the width of 0.1-0.5$\lambda$ by chemical corrosion; finally coating the magnetic material of Nickel onto the surface of the grids by electroplating or chemical plating so as to form the magnetic film 33. the above manufacture method has the advantages of high precision, advanced processing technique, low cost and thin thickness of the main ruler 3, and is well suitable for mass production, especially for producing portable measuring tools. In addition, glass and ceramic may be used as substrate and the magnetic material may be coated onto the substrate according to the pattern of the grids by vacuum plating and etching. In the latter method, the manufacture process of the main ruler 3 may be somewhat complicated and has slightly higher cost, but has better stability. Thus, the latter method is also advisable.

Figure 5:
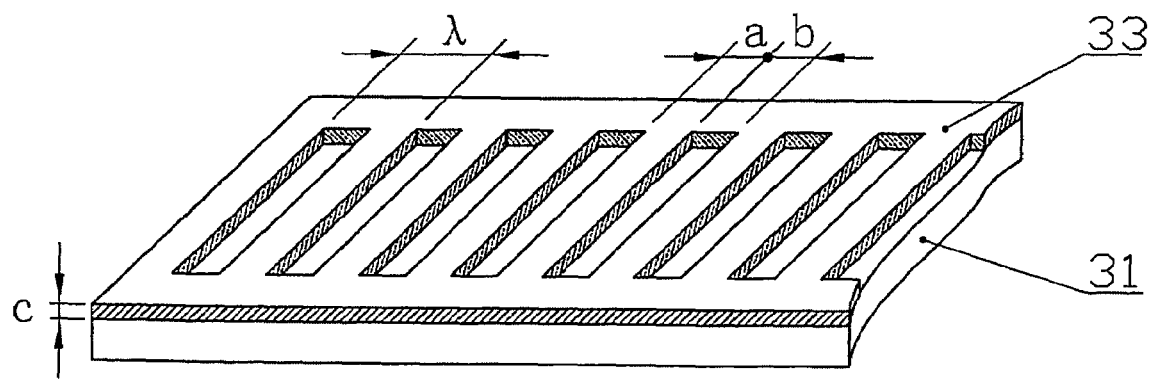
FIG. 5 shows the second embodiment of the main ruler of the invention.

FIG. 5 shows the second embodiment of the main ruler 3. The main ruler 3 is manufactured by the following steps: using non-magnetic material as the substrate 31; making magnetic material be the grids 33 according to the desired grid shape and size by mechanical process, such as punching, milling, linear cutting, etc.; then integrating the grids 33 and the substrate 31 to form the main ruler 3.

Figure 6:
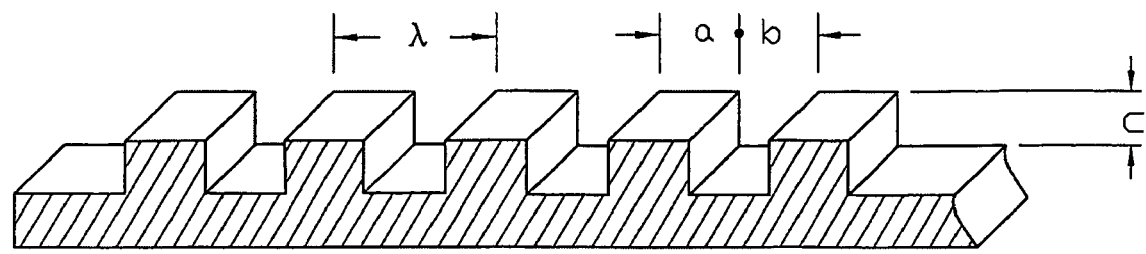
FIG. 6 shows the third embodiment of the main ruler of the invention.

FIG. 6 shows the third embodiment of the main ruler 3. The main ruler 3 is manufactured by directly machining the magnetic material into the grids 33. This manufacturing method imposes a higher requirement on the mechanical process.

Figure 7A:
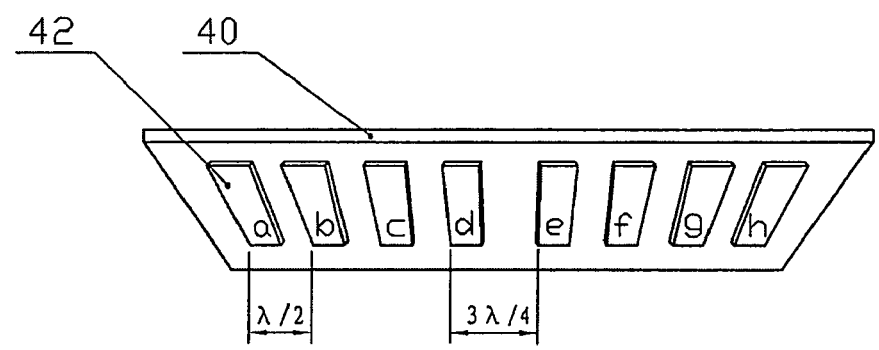
FIG. 7a shows the first embodiment of the distribution of the magnetoresistances of the invention.
Figure 7B:
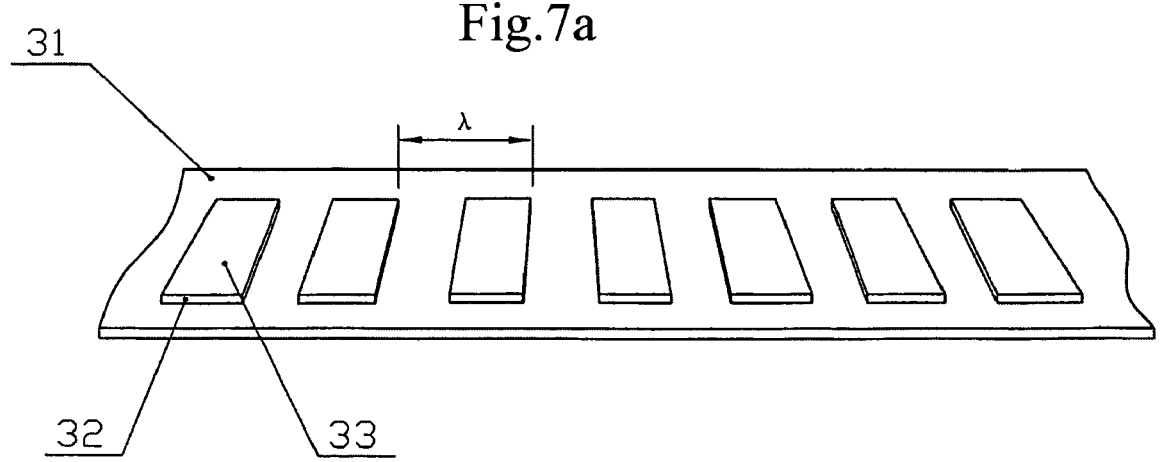
Figure 8:
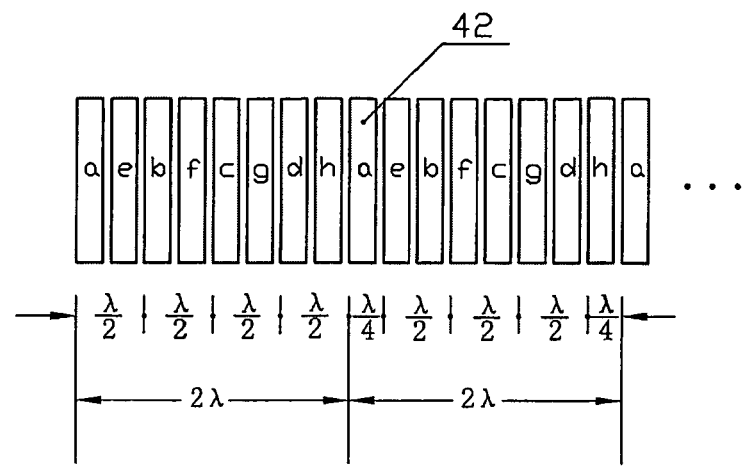
FIG. 8 shows the second embodiment of the distribution of the magnetoresistances of the invention.
Figure 9:
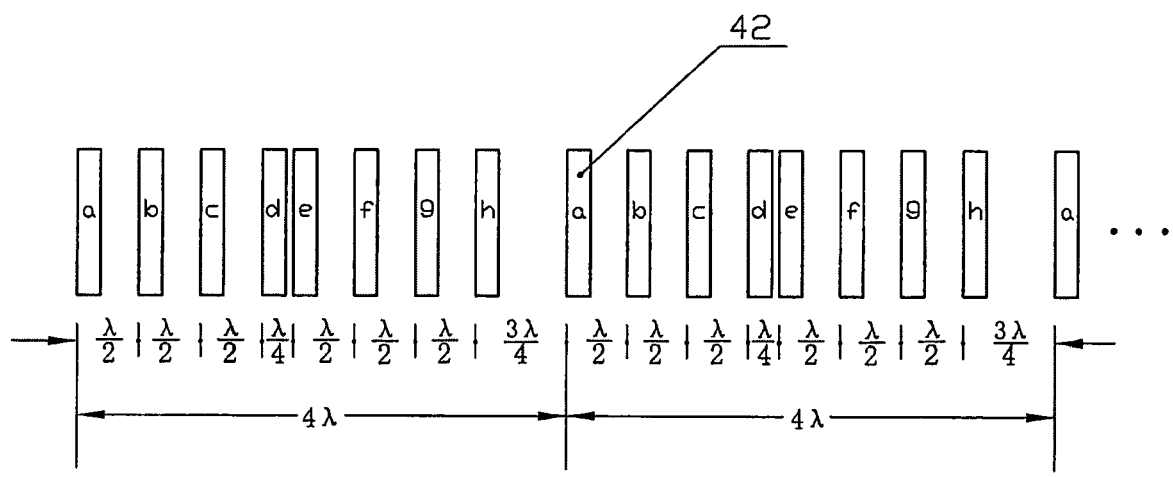
FIG. 9 shows the third embodiment of the distribution of the magnetoresistances of the invention.

FIG. 7a shows the first embodiment of the distribution of the magnetoresistances. Two most basic measurement bridges composed of eight magnetoresistances 42a~42h are shown in the Figure. In practice, in order to reduce the power consumption, these resistors are connected in series, as shown in FIG. 8 and FIG. 9. The magnetoresistances 42a~42d constitutes the bridge S and the magnetoresistances 42e~42h constitute the bridge C; and the position difference between the bridge S and the bridge C is $n\lambda/4$, wherein n=1, 3, 5, 7 . . . , so that the measurement circuit may judge the movement direction of the vernier 2. The magnetoresistances in each bridge are arranged at intervals of $\lambda/2$, as shown in FIG. 7, and are connected sequentially to form the bridge as shown in FIG. 11. Said magnetoresistances 42 may be made of a general magnetic metal film such as NiFe alloy, or semiconductor magnetic material such as InSb. In the present invention, it is preferable to use "Sandwich" structure (exchange biased sandwiches) sandwiched of multilayer films as shown in FIG. 10 to form giant magnetic resistance(GMR), such as multilayer film of (Fe/Cr)N and (Co/Cu)N.

FIG. 8 shows the second embodiment of the distribution of the magnetoresistances. It is composed of groups of magnetoresistances.

FIG. 9 shows the third embodiment of the distribution of the magneic resistors. It is composed of groups of magnetoresistances.

FIG. 10 is a schematic view of the magnetoresistances, i.e., GMR multilayer film structure, which shows the five layers of sandwich structure composed of three layers of Fe and two layers of Cr. In fact, the layers may be up to hundreds of layers, in which the thickness of each Fe film is 0.9-9 nm and the thickness of each Cr film is 0.9-3 nm. In general, the magnetic material and nonmagnetic material are arranged alternately to form the sandwich structure, which can improve the sensitivity of detecting the magnetic field by means of the coupling between layers. The sensitivity thereof is one order higher than that of a general magnetoresistance. Thus, it is beneficial to the detection of the variation of magnetic field on the surface of the main ruler 3. The length of the magnetoresistance 42 is 1-10$\lambda$.

FIG. 11a and FIG. 11b are the circuit diagrams of the measurement bridges S and C. In the order of the distribution of the magnetoresistances shown in FIGS. 7-9, these magnetoresistances are connected to form bridge S and bridge C, respectively.

Figure 12:
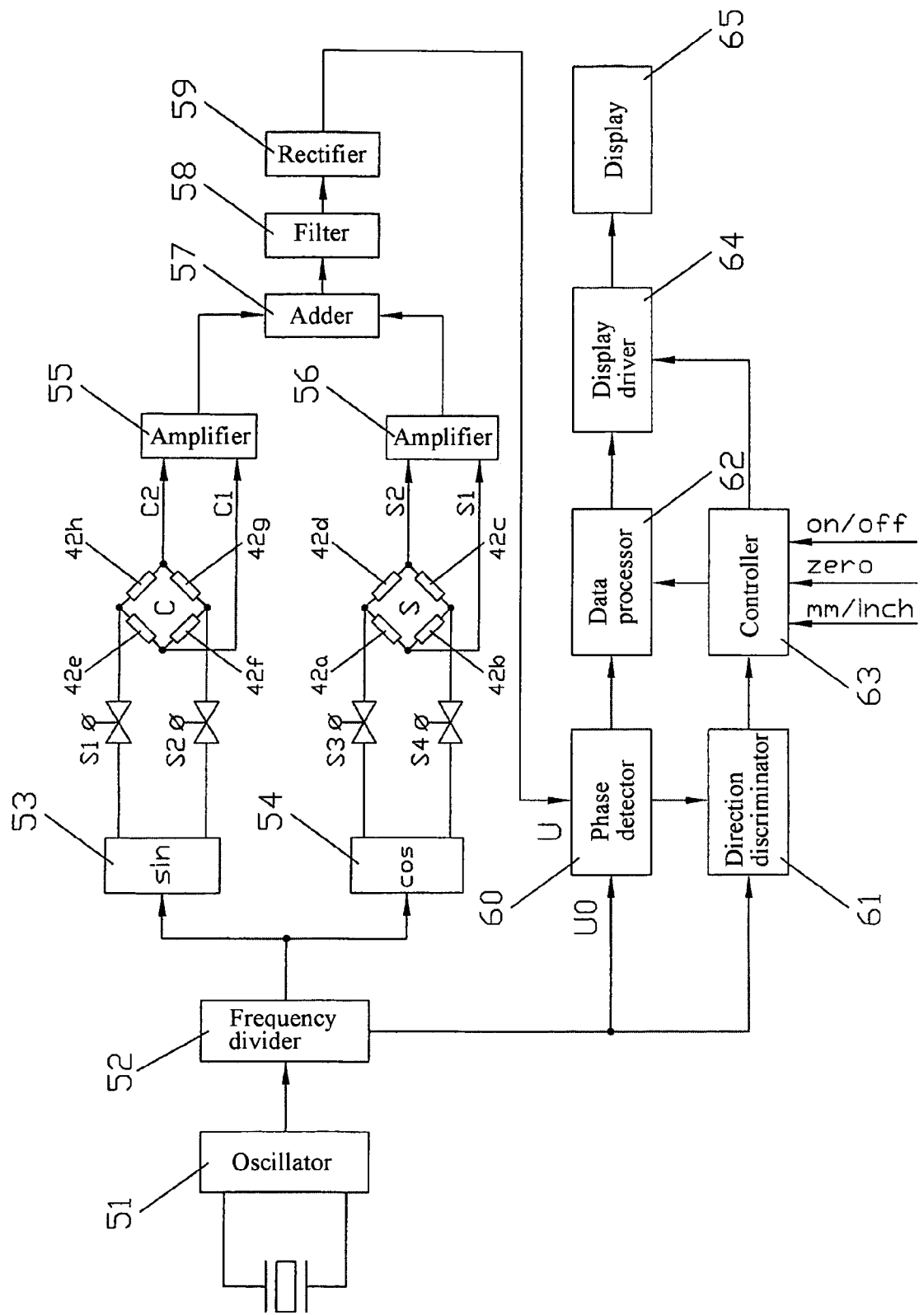
FIG. 12 is a block diagram showing the circuit principle of the first embodiment of a measurement circuit of the invention.

FIG. 12 shows the first embodiment of the measurement circuit, which is the block diagram of the measurement circuit using bridge powered by AC. In this Figure, quartz crystal oscillator 51 produces a clock signal of the whole measurement system; the clock signal is frequency-divided by a frequency divider 52 to produce two orthogonal AC signals, i.e. sine (sin) signal 53 and cosine (cos) signal 54 as power supply signals for the bridge C and the bridge S. That is, the cosine signal 54 with a phase lag of $\pi/2$ is provided to the bridge S with a position lead of $\lambda/4$, while the sine signal 53 with a phase lead of $\pi/2$ is provided to the bridge C with a position lag of $\lambda/4$. Under the control of electronic switches S1~S4, power is intermittently supplied to bridges so as to reduce the power consumption. After the signals output from the bridges are amplified through amplifiers 55, 56, the signals are added up in an adder 57 and then are filtered and rectified in turn by a filter 58 and a rectifier 59. The phase of the obtained signal and the displacement x have associated functions, which are represented by the following equations:

$$U_1 = U_m \sin\left(2\pi \frac{x}{\lambda}\right)\cos\omega t$$

$$U_2 = U_m \cos\left(2\pi \frac{x}{\lambda}\right)\sin\omega t$$

$$U = U_1 + U_2 = U_m \sin\left(2\pi \frac{x}{\lambda} + \omega t\right)$$

The relationship between the output of the bridges S, C and the displacement x may approximate to the sine function and the cosine function, by adjusting the gird pitch $\lambda$ of the grids of the main ruler 3 and the distance d between the magnetoresistance 42 and the main ruler 3. The composite signal U (i.e., the amplified and rectified signal) and the reference signal $U_0$ are compared in a phase detector 60; signals output from the phase detector 60 are used to control a direction discriminator 61 and a data processor 62; then the processed results are displayed on a liquid crystal display screen 65 via a display driver 64. When the measuring jaws 10 and 20 of the caliper are closed, a zero signal is output through the clear button, a controller 63 and the data processor 62, and then zero is displayed on the display screen 65. When the vernier 2 of the caliper moves, the phase of the composite signal will change, the phase detector 60 will output a digital quantity in linear relation with a displacement quantity, and the digital quantity will be processed into the displacement quantity through the data processor 62, and then the display driver 64 drives the liquid crystal display screen 65 to display the displacement quantity. According to the movement direction of the vernier 2, the signal output from the direction discriminator 61 controls the addition and subtraction of data. Other functions, such as metric/inch conversion (mm/inch), power supply control (on/off),etc. may be realized by the controller 63. Each of said amplifier, said adder, said filter, said rectifier, said phase detector, said direction discriminator, said data processor, said controller, said display driver and the display is known circuit.

Figure 13:
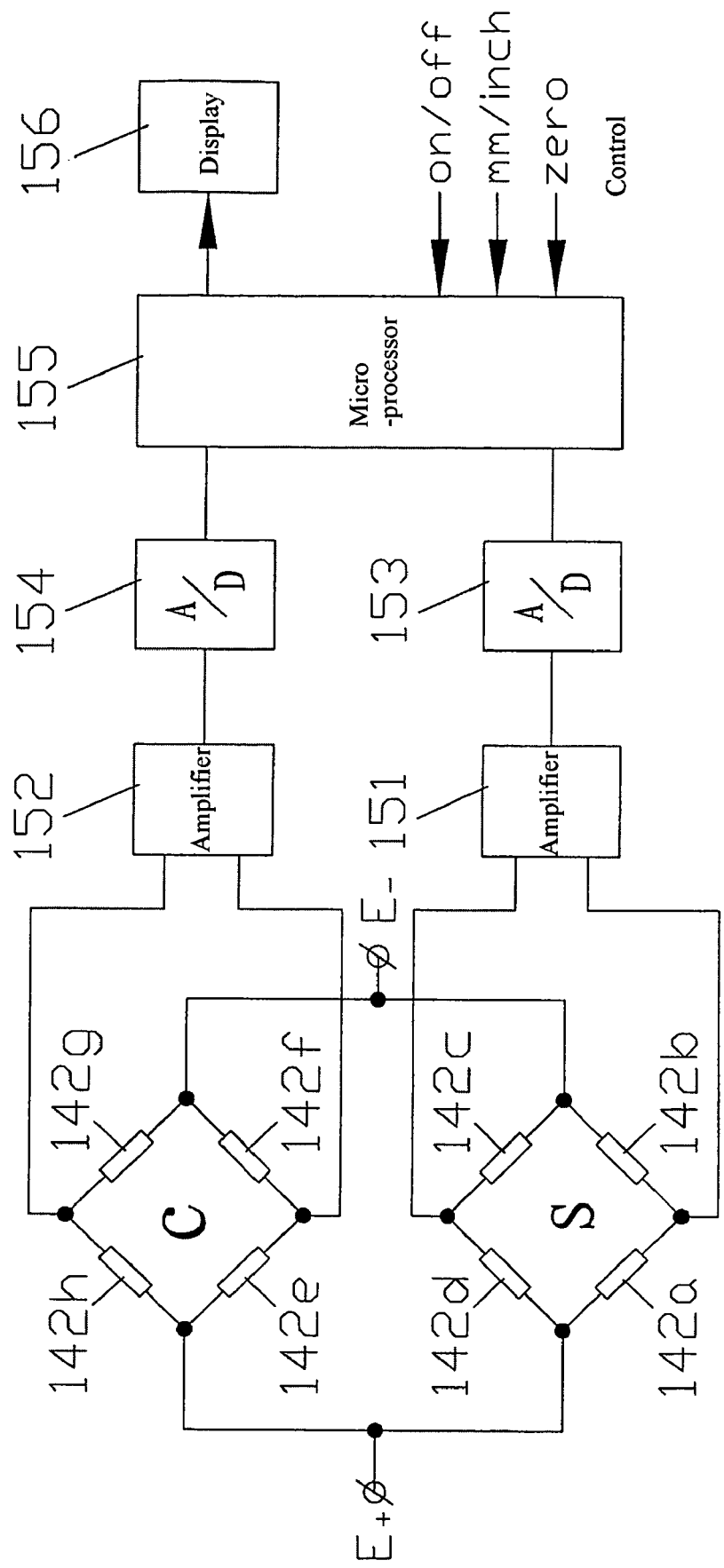
FIG. 13 is a block diagram showing the circuit principle of the second embodiment of a measurement circuit of the invention.

FIG. 13 shows the second embodiment of the measurement circuit, which is the block diagram of the measurement circuit using bridge powered by DC. The same DC power supply E is provided to the bridge S and the bridge C. Since the position difference between the bridge S and the bridge C is $\lambda/4$, the outputs from the two bridges are different. If the vernier 2 moves on the main ruler 3 at uniform speed, a sine signal is output from the bridge S and a cosine signal is output from the bridge C. The analog signals output from the bridge S and the bridge C are transmitted into A/D converters 153, 154, respectively, the digital signals output from the A/D converters 153, 154 are simultaneously transmitted into the microprocessor 155. The microprocessor 155 can calculate the displacement quantity according to the amplitude of the signals output from the bridges, discriminate the displacement direction according to the relationship of the signals output from the two bridges and finally determine the position of the vernier with respect to the ruler body. The processed results will be displayed on the display 156.

INDUSTRIAL APPLICABILITY

The magnetic displacement measurement device provided by the present invention not only can normally work in the wet and oil polluted environment, but also has the feature of simple structure, convenient manufacture, low price, low power consumption and high precision. Besides being used for the conventional vernier caliper, the device may be made in the shape of round or cylinder for being used as angle measurement device. The present invention uses the composite material combined by the epoxy glass cloth and copper foil (i.e., printed circuit board (PCB)) and manufactures the girds at constant interval by the process of the chemical corrosion, and then coats the magnetic material such as Ni, Fe, Co etc. onto the surface of the grids so that the magnetic field intensity along the movement direction varies periodically with the interval among the grids. Alternatively, the main ruler may be manufactured by using the glass or ceramic as the substrate and then plating the magnetic material onto the surface thereof, so that the main ruler has the advantage of high manufacture precision, advanced processing technique and low cost, and is well suitable for mass production. In the present invention, a GMR with the "sandwich" structure sandwiched of multi-layer film is used as the magnetoresistance which is a sensitive element for detecting the magnetic field. Thereby the sensitivity of detection the magnetic field is improved by the coupling between layers. The resistance change rate is one order higher than that of a general magnetoresistance made of a single film structure, so that a slight change of the magnetic field may be detected conveniently and the manufacture of the measurement circuit and the main ruler becomes easy. In the present invention, the spatial position difference between two measurement bridges is $\lambda/4$; two AC signals with phase difference of $\pi/2$ are respectively supplied to the two bridges such that an AC signal with a phase lag of $\pi/2$ is supplied to the bridge with a position lead of $\lambda/4$, while another AC signal with a phase lead of $\pi/2$ is supplied to the bridge with a position lag of $\lambda/4$; the phase of the composite signal of the two bridges is in linear relation with the displacement x and varies with the period of grid pitch $\lambda$; meanwhile, the displacement direction can be discriminated according to the relationship between the two signals output from the two bridges and finally the position of the vernier with respect to the ruler body can be determined.

What is claimed is:

1. A magnetic displacement measurement device, comprising a ruler body and a vernier which can move with respect to the ruler body, wherein a magnetic main ruler is fixed on the ruler body, and a secondary ruler is fixed on the vernier; the secondary ruler comprises a magnetic sensor and a measurement circuit thereon; said measurement circuit outputs the signal of movement distance to a signal output device; being characterized in that:

said magnetic main ruler is of grid type, wherein grids are arranged at a constant interval along a movement direction with a grid pitch of $\lambda$;

said magnetic sensor is composed of giant magnetoresistances which are opposite to the magnetic main ruler and arranged along the movement direction; and said measurement circuit comprises at least two measurement bridges which are composed of giant magnetoresistances and are electrically connected with an AC power supply, such that the measurement bridges receive AC power as input.

2. The magnetic displacement measurement device according to claim 1, being characterized in that: said magnetic main ruler is provided such that magnetic grids arranged with a grid pitch of $\lambda$ are provided on a nonmagnetic material substrate, and the magnetic grids form a grid-type magnetic field with a permanent magnet, or are magnetized directly to form a grid-type magnetic field.

3. The magnetic displacement measurement device according to claim 1, being characterized in that: the giant magnetoresistances of said magnetic sensor are formed of at least one layer of magnetic film and nonmagnetic film which are alternately arranged.

4. The magnetic displacement measurement device according to claim 3, being characterized in that: the magnetic film of said giant magnetoresistances is selected from one of metal film, alloy film or semiconductor film.

5. The magnetic displacement measurement device according to claim 1, being characterized in that: the phase difference of the AC power supply connected with said at least two measurement bridges is $\pi/2$.

6. The magnetic displacement measurement device according to claim 1, being characterized in that: said magnetic main ruler is provided such that magnetic grids arranged with a grid pitch of $\lambda$ are provided on a nonmagnetic material substrate; the giant magnetoresistances of said magnetic sensor are formed of at least one layer of magnetic film and nonmagnetic film which are alternately arranged; and the phase difference of the AC power supply connected with two measurement bridges is $\pi/2$.

7. The magnetic displacement measurement device according to claim 1 or 6, being characterized in that: the position difference between the giant magnetoresistances of an arm of the two measurement bridges and that of an arm, which locates in a corresponding position therewith, of the other of the two measurement bridges is $n\lambda/4$, wherein n=1, 3, 5, 7 . . . .

8. The magnetic displacement measurement device according to claim 1 or 5, being characterized in that: the measurement bridge with a position lead of $n\lambda/4$ is provided with an AC signal with a phase lag of $\pi/2$, wherein n=1, 3, 5, 7 . . . ; the measurement bridge with a position lag of $n\lambda/4$ is provided with an AC signal with a phase lead of $\pi/2$, wherein n=1, 3, 5, 7 . . . .

9. The magnetic displacement measurement device according to claim 1 or 6, being characterized in that: said measurement bridges are composed of at least two giant magnetoresistances, wherein respective resistors of two adjacent arms of a single bridge are giant magnetoresistances with a position difference of $n\lambda/2$, n=1, 3, 5, 7 . . . .

10. The magnetic displacement measurement device according to claim 1 or 6, being characterized in that: the position difference between respective giant magnetoresistances of two arms facing each other in said measurement bridges is $m\lambda$, wherein m=0, 1, 2, 3, . . . .

11. The magnetic displacement measurement device according to claim 1 or 6, being characterized in that: the giant magnetoresistances on each arm of said measurement bridges are composed of constant number of giant magnetoresistances in series with different positions, and a position difference thereof is $m\lambda$, wherein m=0, 1, 2, 3, . . . .

12. The magnetic displacement measurement device according to claim 1 or 6, being characterized in that: the width of said giant magnetoresistances is smaller than $\lambda/2$.

13. The magnetic displacement measurement device according to claim 1 or 6, being characterized in that: said two measurement bridges output signals, a phase of which is in a function relation with the displacement, the signals are summed and then converted into digital signals through A/D conversion, and the digital signals are coupled with the signal output device.

14. The magnetic displacement measurement device according to claim 2 or 6, being characterized in that: said magnetic main ruler is provided such that magnetic grids with the grid pitch of $\lambda$ are formed on the nonmagnetic material substrate by plating and etching process, or are embedded in the nonmagnetic material substrate.

15. The magnetic displacement measurement device according to claim 2 or 6, being characterized in that: said magnetic main ruler is provided such that convexes and concaves in grid type with the grid pitch of $\lambda$ are formed on the surface of the magnetic material.

* * * * *